Jan. 13, 1931. W. S. BAYLIS 1,788,653
PROCESS OF TREATING CRUDE OIL HAVING TAR AND ASPHALT CONTENT
Filed Nov. 12, 1927
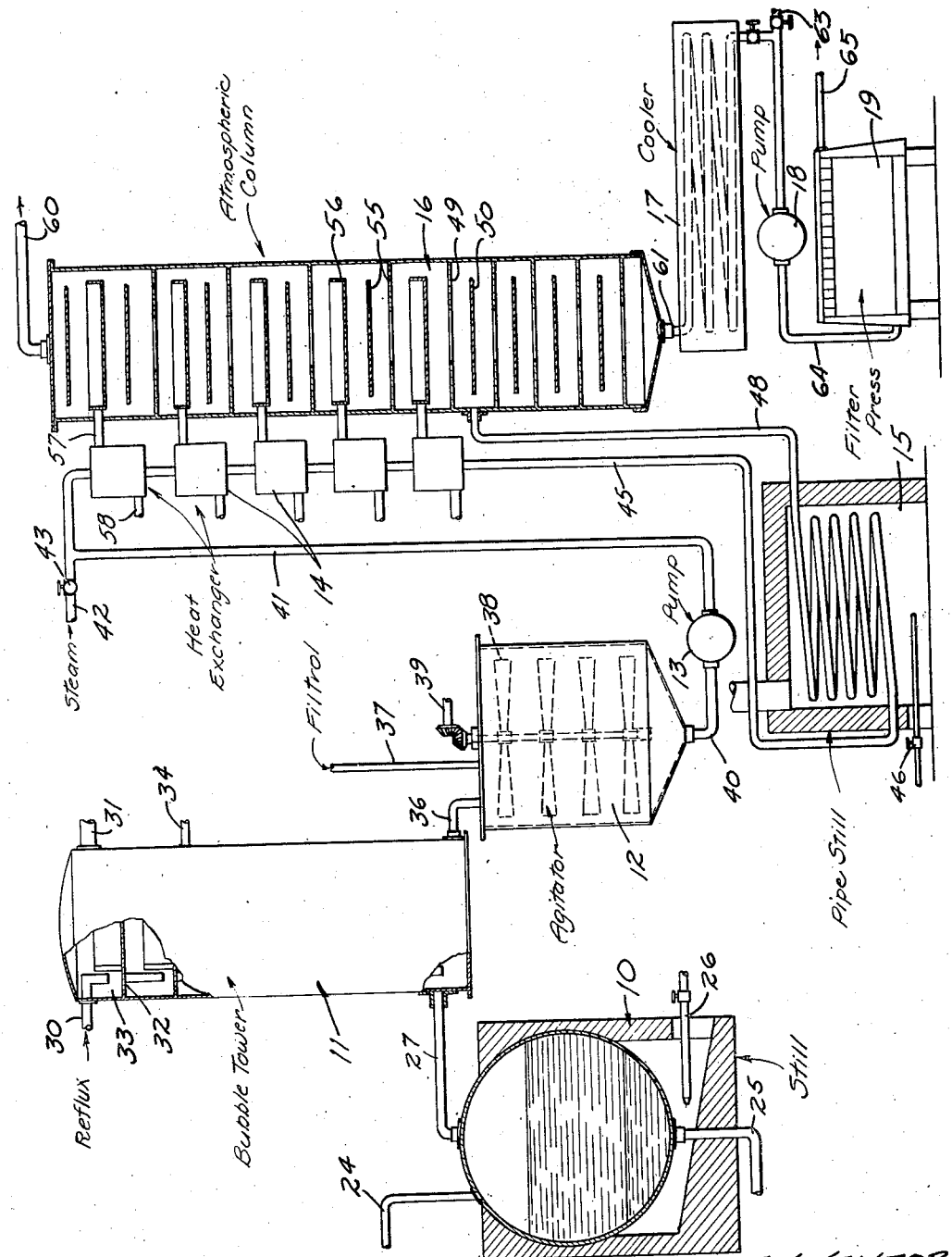
INVENTOR:
WALTER S. BAYLIS
BY
Ford W. Harris
ATTORNEY.

Patented Jan. 13, 1931

1,788,653

UNITED STATES PATENT OFFICE

WALTER S. BAYLIS, OF LOS ANGELES, CALIFORNIA, ASSIGNOR, BY MESNE ASSIGN-
MENTS, TO FILTROL COMPANY OF CALIFORNIA, OF LOS ANGELES, CALIFORNIA, A
CORPORATION OF CALIFORNIA

PROCESS OF TREATING CRUDE OIL HAVING TAR AND ASPHALT CONTENT

Application filed November 12, 1927. Serial No. 232,738.

My invention relates in particular to petroleum oil processes and it consists in a process of treating oil in the production of lubricating oils. Although my invention may be used in connection with the refining of various classes of oils, I shall, for the purpose of illustration, describe my invention as used for producing lubricating oil.

When crude oil is refined to produce lubricating oil, it is usually separated into its various products by fractional distillation or steam reduction so that the "cracking" and decomposition will be kept as low as possible. The distillates, cuts, or stocks derived from the crude oil in the fractional distillation leave the cylinder stock from which the lubricating oil is produced.

Most of the products obtained by the distillation of crude petroleum oil are not in a marketable condition and must be purified or chemically treated to remove resinous matters, hydrocarbons of unsaturated and aromatic groups, and other impurities which give the products dark colors and unpleasant odors. It is the general practice to purify such products by subjection to the action of $H_2SO_4$ and afterward by NaOH which completes the purification and neutralizes any remaining sulphuric acid. Purifying processes of this kind have certain disadvantages. Considerable acid sludge is formed ranging from five to thirty per cent in volume which is an appreciable loss. Also this sludge must be separated, and this separation takes considerable time.

It is an object of this invention to provide a process of purifying oil which is superior to other processes since it is more rapid in treating the oil, does not have appreciable waste, and does not require expensive equipment.

It is another object of this invention to provide a process in which the oil is distilled or fractionated, and purified at the same time.

I have found that oil may be purified by mixing it with an adsorptive material which absorbs all the impurities from the oil. This adsorptive material is subsequently filtered from the oil, thus leaving the oil free from impurities. Acid-treated clay is very suitable for use as an adsorptive material and I design to use this in my process.

It is, accordingly, an object of this invention to provide a process of treating which involves the adsorbing of impurities from the oil by use of an adsorptive material.

It is yet another object of this invention to provide a process which includes the mixing of oil with an adsorptive material and then simultaneously subjecting the mixture to the action of a hot vapor such as steam for distillation purposes. On some grades of oil, I have found it desirable to use a very small percentage of free acid for expediting the purification of the oil. In this case the acid is mixed with the clay before it is added to the oil. The acid is thus adsorbed by the clay, no sludge results from the treatment of the oil by the acidified clay, and a later treatment to neutralize the oil is not required.

It is another object of this invention to provide a process which ordinarily requires no separate acid treatment of the oil.

Further objects and advantages will be made apparent in the following description taken in connection with the accompanying drawing in which an apparatus for carrying out the method of my invention is diagrammatically illustrated.

Referring specifically to the drawing, the apparatus of my invention includes a batch still 10, a bubble tower 11, an agitator 12, a pump 13, a series of heat exchangers 14, a pipe still 15, an atmospheric column 16, a cooler 17, a hydraulic pump 18, and a filter press 19.

The batch still 10 is adapted to be charged, as by a pipe 24, drained as by a pipe 25, and heated as by fuel discharged from a burner 26 disposed therebeneath. Connecting the still 10 with the lower portion of the bubble tower 11 is a vapor line 27. Opening into the upper end of the bubble tower 11 is a reflux pipe 30, and leading from the upper end of the tower 11 is a gasoline-vapor line 31. Disposed within the bubble tower 11 is a series of floors 32, each of which provides a collecting chamber 33. Leading from one of these chambers 33 is a pipe 34 through which water-white oil or kerosene is adapted to be withdrawn from the bubble tower 11. Leading from the lower end of the bubble tower 11 and discharging into the agitator 12 is a lubricating-cut pipe 36. Also discharging into the upper end of the agitator 12 is an adsorptive-material-fee pipe 37. Disposed within the agitator 12 is an agitating rotor 38 which is adapted to be rotated in any suitable manner as by the gears 39. Connecting the lower end of the agitator 12 with the intake of the pump 13 is a pipe 40, while connecting the discharge end of the pump 13 with the intake end of the series of heat exchangers 14 is a pipe 41. Connected with the pipe 41 at an elbow thereof is a steam pipe 42 having a valve 43. Connecting the outlet end of the series of heat exchangers 14 with the intake end of the pipe still 15 is a pipe 45. The pipe still 15 is heated in any suitable manner as by fuel supplied by a burner 46. The discharge end of the still 15 is connected to an intermediate portion of the atmospheric column 16 by a pipe 48. Beneath the point at which the pipe 48 enters the column 16, a series of baffle plates 49 and 50 is disposed in alternating relation so that any liquid discharged through the pipe 48 into the column 16 must pass in a circuitous route from the point of discharge to the bottom of the column 16.

Disposed in the atmospheric column 16 above the point at which the pipe 48 connects thereto are pairs 55 of baffle plates 49 and 50. These pairs 55 are positioned in spaced relation so as to make room between adjacent pairs for collector pans 56. Each of the collector pans 56 is connected by a pipe 57 to one of the heat exchangers 14 from which pipes 58 lead to suitable distillate storage tanks. Leading from the upper end of the atmospheric column 16 is a fixed-gas line 60. Connecting the lower end of the atmospheric column 16 to the inlet end of the cooler 17 is a pipe 61. Connecting the discharge end of the cooler 17 to the inlet end of the pump 18 is a pipe 62 into which a solvent pipe 63 connects. The discharge end of the pump 18 is connected to the filter press 19 by a pipe 64. The filter press 19 may be any suitable type of press, but it is preferably a Sweetland press. Leading from this press is a liquor discharge pipe 65.

The operation of the apparatus above described in carrying out the process of my invention is as follows:

As this process is particularly concerned with handling crude oil containing considerable amounts of tar or asphalt, the still 10 is first charged through the pipe 24 with a suitable quantity of crude oil of this character. The oil is then heated in the still 10 so as to drive off the more volatile fractions of the oil in the form of vapors which pass through the vapor line 27 into the bubble tower 11. These vapors pass upward through the bubble tower 11 and the heavier of the vapor fractions condense in the lower of the chambers 33 and the more volatile vapor fractions pass on upward so that gasoline vapors all pass out through the vapor line 31 leading from the upper end of the tower 11. The line 31 leads to any suitable condenser in which the gasoline vapors are condensed.

The only light distillate which is preferably condensed into a liquid in the tower 11 is water-white oil or gasoline which is drawn off through the pipe 34. If desired reflux may be admitted through the pipe 30.

The remaining fractions of the vapor which are condensed in the tower 11 are of a heavy character and combine to form what is known as the "lubricating cut" which passes through the pipe 36 into the agitator 12. As the lubricating cut flows into the agitator 12, an adsorptive agent, which is preferably the acid-treated clay known as "Filtrol" but which may be any of the other well known adsorptive clays, is fed into the agitator 12 through the pipe 37. The agitator rotor 38 is rotated constantly so as to mix the lubricating cut of oil and the adsorptive agent. The mixture is drawn from the bottom of the agitator 12 through the pipe 40 by the pump 13 and discharged through the pipe 41 into the upper end of the series of heat exchangers 14. At this point, the valve 43 may be opened and steam forced into the mixture so as to raise the temperature of the mixture and accelerate any adsorptive tendency which the adsorptive agent may have on the lubricating cut as the temperature of the mixture is gradually raised in its passage through the series of heat exchangers 14.

The mixture usually enters the first of the heat exchangers 14 at a temperature of approximately 240° F. and leaves the last of the heat exchanger 14 through which it passes at a temperature of approximately 410° F. The mixture is then conducted through the pipe 45 to the pipe still 15, where it is raised to a temperature of substantially 750° F. at which temperature it is discharged from the pipe 48 into the atmospheric column 16. The mixture, entering the column 16, flows down through a circuitous path over the baffle plates 49 and 50 and releases all of the lighter fractions of the lubricating cut so that the residuum which collects in the lower end of the column 16 comprises a mixture of fractions which is termed cylinder stock and which has an average density of 26° Bé.

The various fractions of lubricating cut which pass upward through the column 16 in the form of vapors are condensed and cooled in the various pans 56, and flowing outward through the heat exchangers 14, effect a rise of the temperature of the lubricating cut and adsorptive agent mixture as previously mentioned. Any fixed gas released in the column 16 passes from the column through the line 60 to suitable storage or point of discharge.

The various fractions thus condensed in the column 16, in order of decreasing boiling points, may include the following:

| | |
|---|---|
| Wax slop | B. P. 650° F. |
| Wax distillate | B. P. 600° F. |
| Gas oil | B. P. 550° F. |
| Mineral seal | B. P. 500° F. |

The cylinder stock which collects in the lower end of the column 16 flows through the cooler 17 and the pipe 62 to the pump 18. At this time a suitable solvent is introduced through the pipe 63 into the cylinder stock so that it may be handled more easily by the pump 18 and filter 19. The pump 18 forces the diluted cylinder stock through the pipe 64 into the filter press 19 which retains the adsorptive clay and permits the purified cylinder stock to be discharged through the pipe 65 which conducts it to a suitable place of storage. When a sufficient amount of cake has been formed in the filter press 19, the flow of mixture through this filter press is stopped and switched to another similar filter press held in readiness for this purpose. The cake in the filter press 19 is then washed with a suitable solvent so as to remove any of the remaining cylinder stock from the cake. Suitable provision may also be made for blowing the cake in the press with air and steam after removing the retained oil so as to drive out the excess of solvent and dry the cake. Thereafter the filter press is opened and the cake removed and conveyed by any suitable means, such as a belt conveyor, to the reactivating house where the clay is reactivated so as to again be suitable for use in the above described process.

When a given charge in the still 10 has been reduced to a residuum consisting mainly of tar and asphalt, this is drained to suitable storage through the drain pipe 25 and the still recharged with a fresh supply through the pipe 24.

As stated above, this process has been particularly successful with the use of "Filtrol" which is a product that has been chemically treated so that there are no elements therein to cause any chemical reaction when acid is added to it. Therefore, no sulphates are formed as is the case when acid is added to a natural or untreated earth. When "Filtrol" is used as the adsorptive agent, it is possible to add a slight amount of acid following the reactivating process so that the "Filtrol" acts as a carrier for the acid in an unaltered state. Thus, due to the enormous surfaces in the "Filtrol" on which the acid is carried in a thin film, there is very powerful action on the oil, even when an extremely small amount of acid has been added to the "Filtrol."

Another great advantage of using the acid in this manner is that it acts upon the oil without being given up by the "Filtrol" so that neutralization of the final oil product is unnecessary.

In addition to the advantages of my process above noted, the submitting of the lubricating cut of oil to the complete fractionating process in the presence of the acidified adsorptive agent purifies the oil by removing asphaltenes and unsaturated hydrocarbons which form in the stills 10 and 15 while the oil is being refined, so that the usual additional purifying step of acid and caustic treatment may be entirely dispensed with.

It is also desired to point out that the impure substances are absorbed by the adsorptive clay before the vapors are discharged from the mixture of oil and clay in the column 16, so that fractions condensed in the pans 56 of the column 16 are already purified, and further treatment of these is therefore unnecessary.

A novel and very important feature of my invention is thus seen to be the treatment with an adsoptive agent of the oil being distilled in both its liquid and vapor phases. Another novel feature of importance is treating these liquid and vapor phases as they are interchanging with each other by alternate vaporization and condensation. The purification of the various products into which the oil is divided is thus accomplished concurrently with the distillation and with an efficiency and purity of product hitherto unknown.

I claim as my invention:

1. A process of treating crude oil having tar and asphalt content which consists in eliminating the tar and asphalt content by vaporizing the lighter oil fractions therefrom, fractionally condensing the lubricating cut of such vapors from the mixture thereof, mixing an adsorptive clay with said lubricating cut, raising the temperature of said mixture sufficiently to vaporize the lighter fractions of said lubricating cut, discharging said heated mixture into a fractionating tower wherein the said lighter fractions are vaporized, condensing and withdrawing the evolved vapors, withdrawing and cooling the mixture of unvaporized residue and clay, and filtering the residue from the clay to obtain a cylinder stock.

2. A process as defined in claim 1 in which steam is injected into the first mentioned mixture prior to its being heated to fractionating temperature.

3. A process as defined in claim 1 in which said adsorptive agent is an acid-treated clay.

4. A process for refining lubricating oil which comprises mixing the oil with adsorbent clay, passing the resultant mixture in a restricted stream through a heating zone and heating the same therein to a temperature sufficient to vaporize lighter fractions of the lubricating oil, discharging the heated mixture into a fractionating zone at a point substantially above the bottom thereof wherein the oil flows downwardly toward the bottom of said fractionating zone whereby said lighter fractions are released from the mixture and the released vapors ascend toward the upper portion of said fractionating zone, fractionally condensing said vapors in the portion of said fractionating zone above the point of introduction of the heated mixture thereto, separately removing the condensed fractions from said fractionating zone, withdrawing the mixture of unvaporized lubricating oil and clay from the lower portion of said fractionating zone, and separating the clay from said unvaporized lubricating oil.

5. A process according to claim 4 in which the adsorbent clay has been activated with acid.

6. A process according to claim 4 in which the adsorbent clay has been activated with acid, is free from sulfate salts and carries a small proportion of free acid on its surfaces.

7. A process according to claim 4, in which the heating occurs in the presence of steam which has been introduced directly into the oil.

In testimony whereof, I have hereunto set my hand at New York, New York, this 3rd day of November, 1927.

WALTER S. BAYLIS.